May 28, 1940.  W. J. BAZAREK  2,201,982
COMBINATION TIRE CHANGER AND WHEEL BALANCER AND TOOL THEREFOR
Original Filed July 13, 1935   5 Sheets-Sheet 4
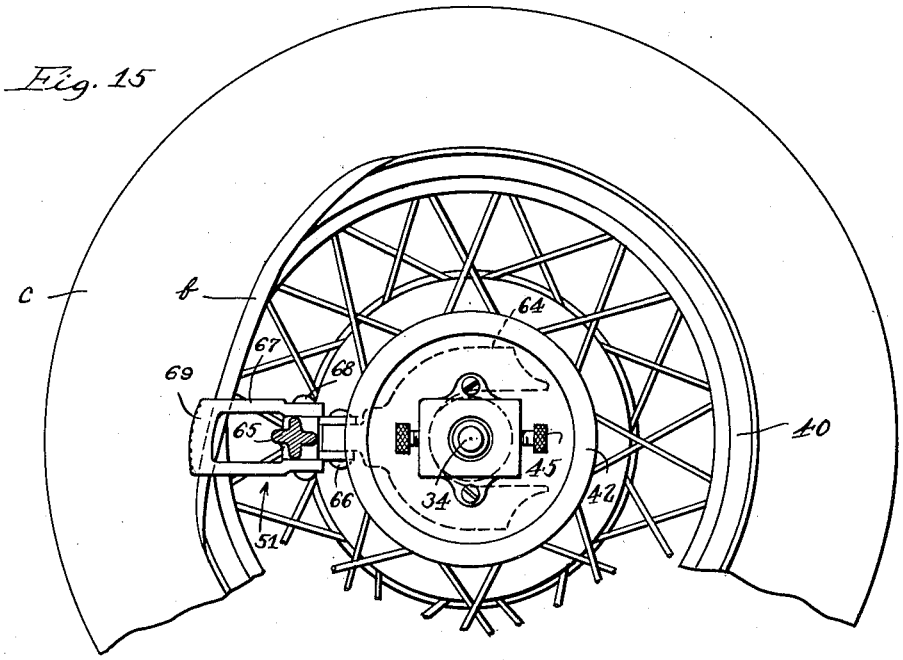
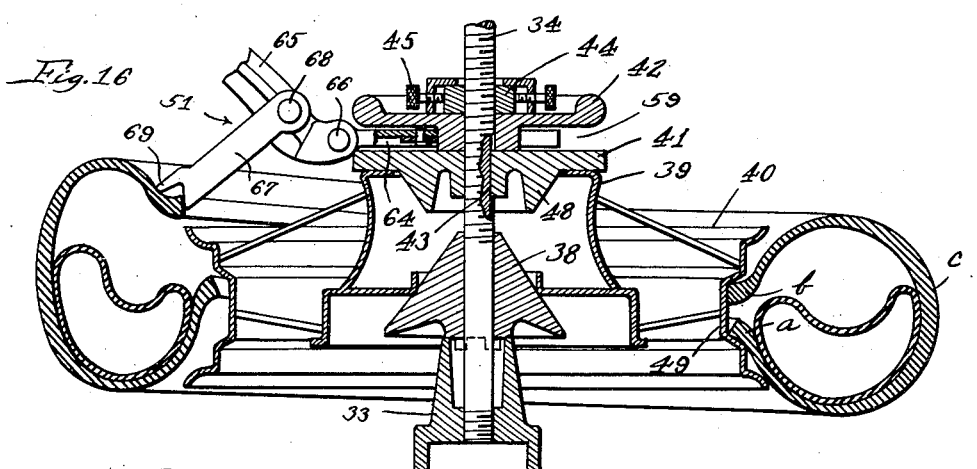
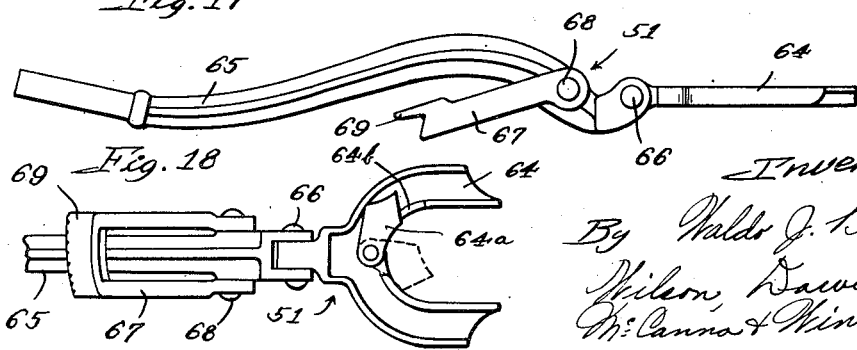

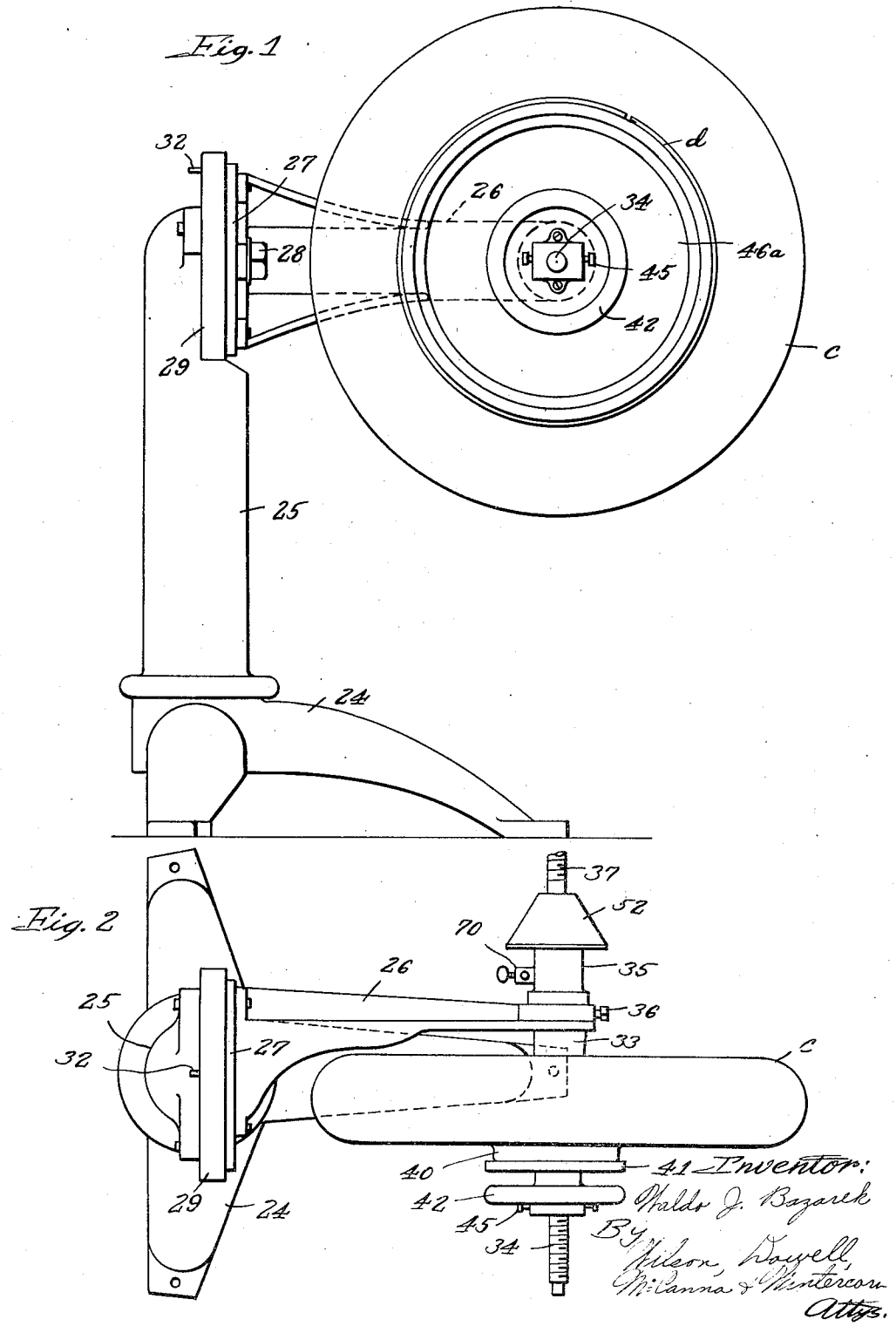

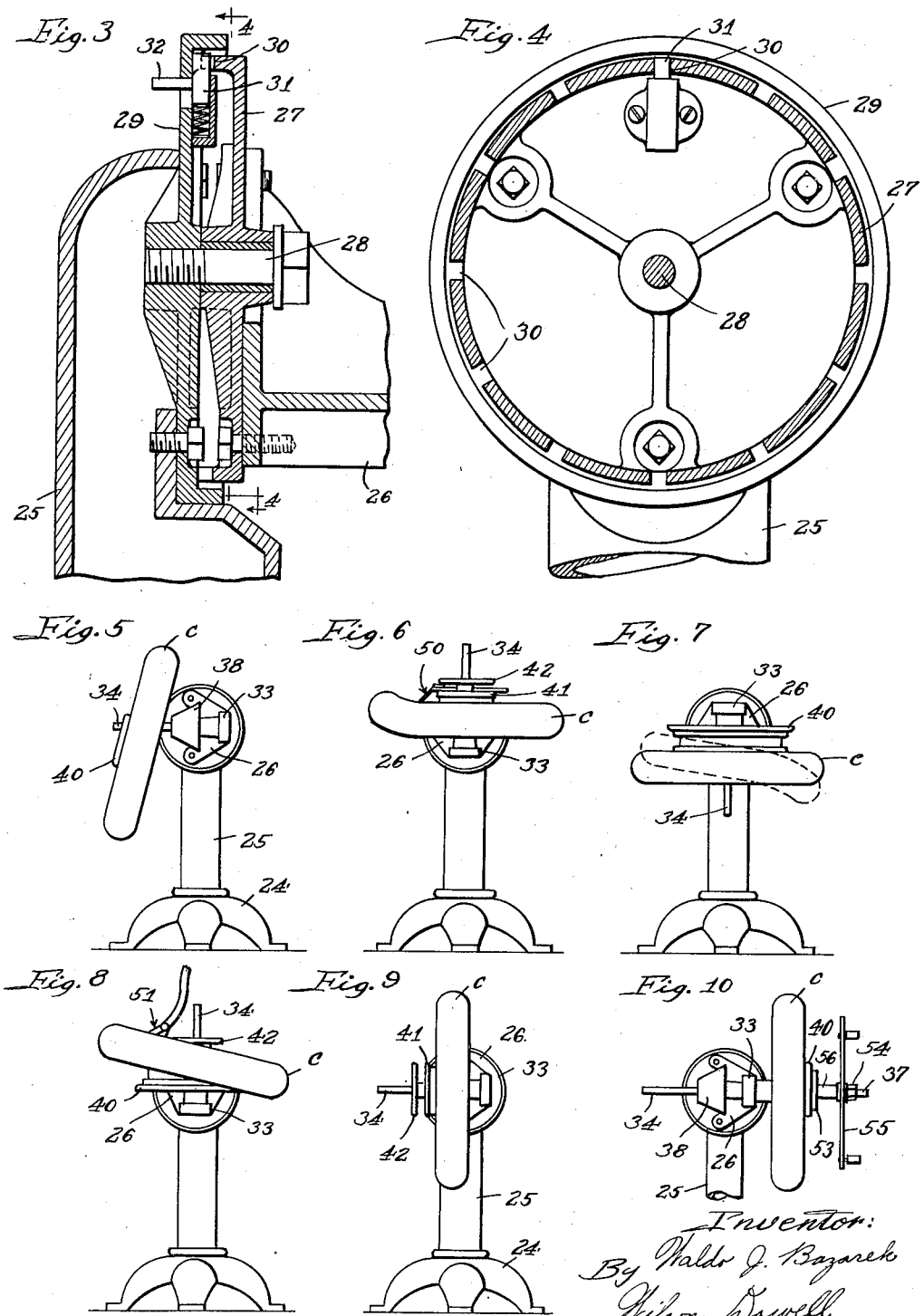

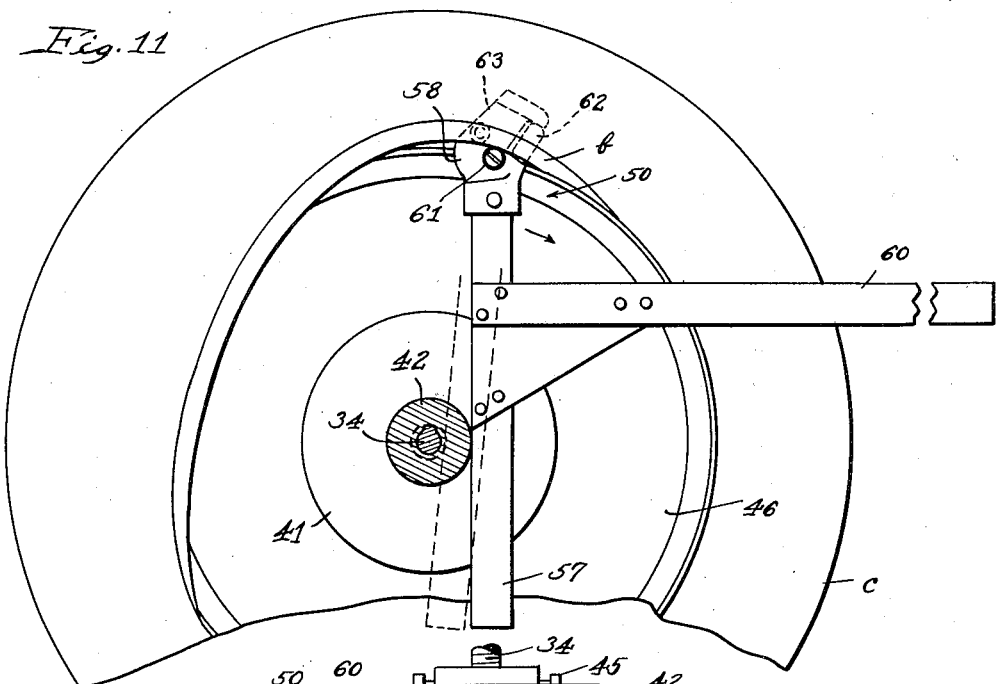
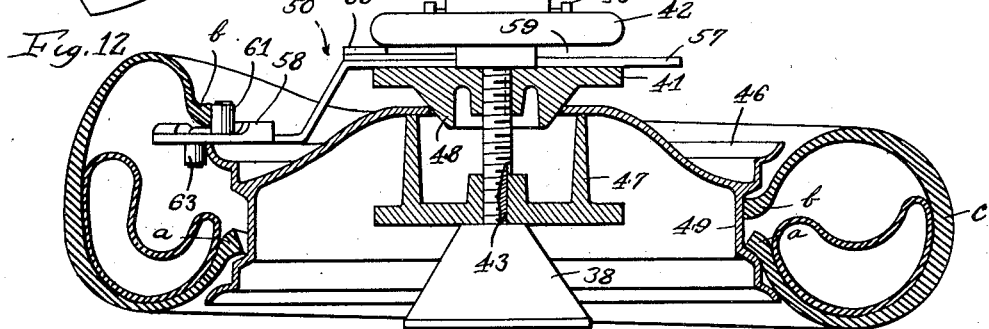
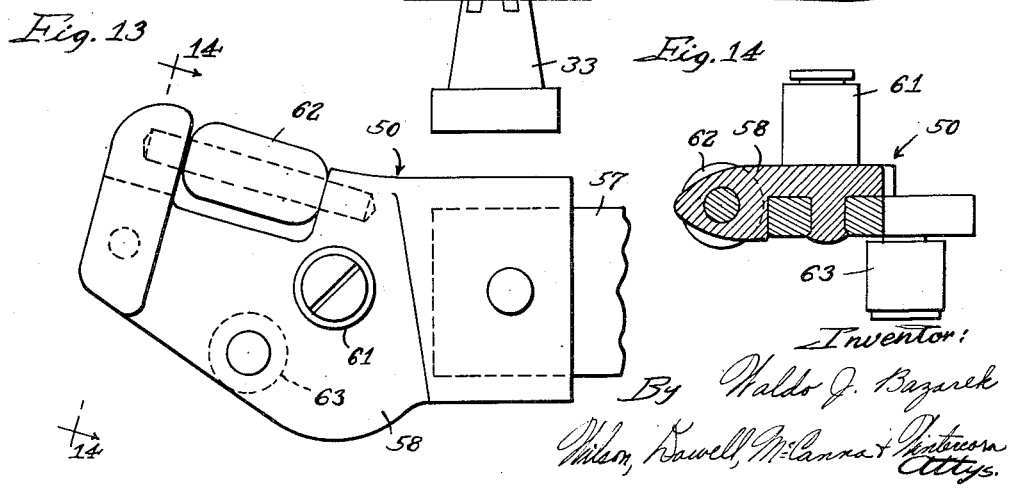

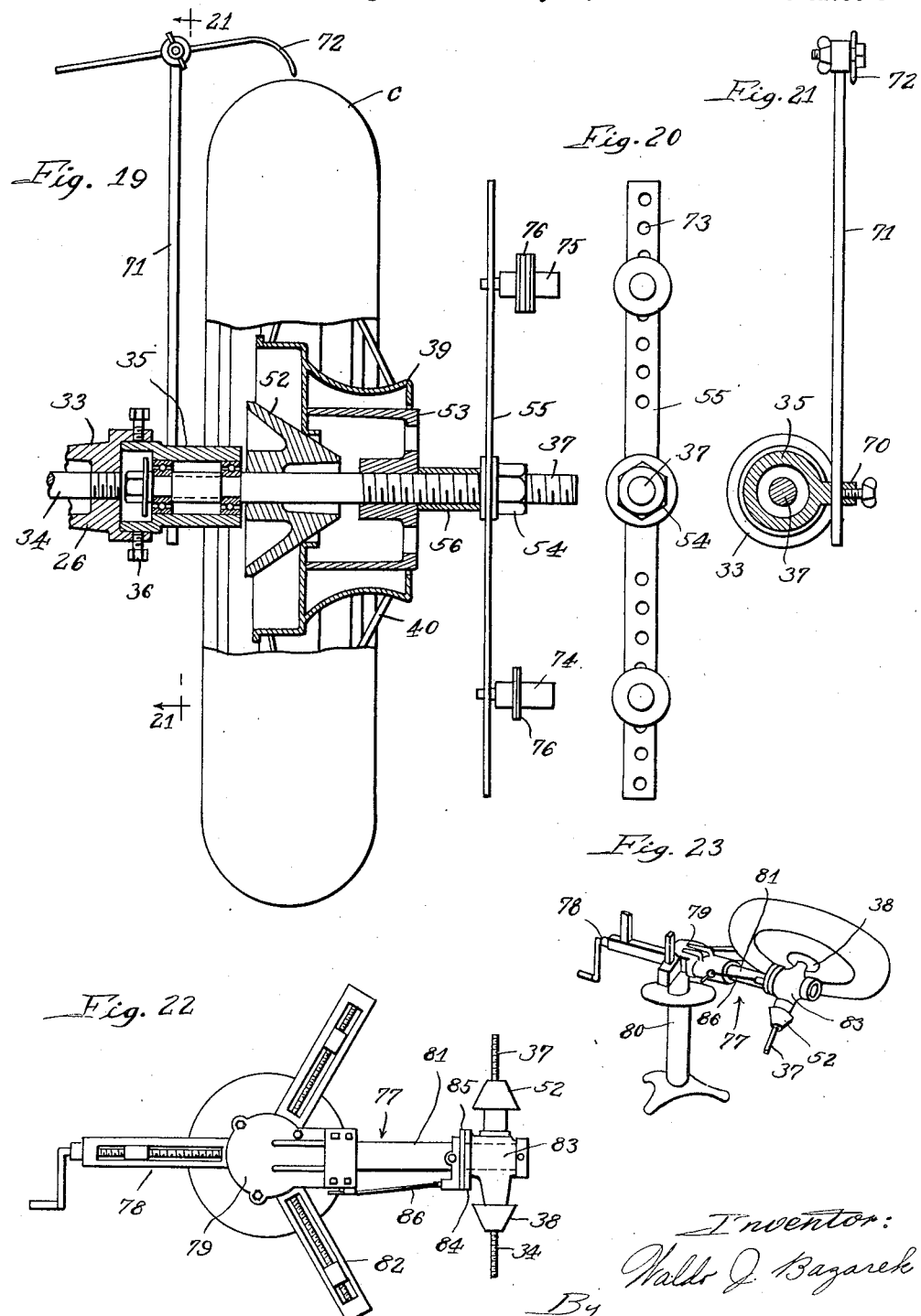

Patented May 28, 1940

2,201,982

UNITED STATES PATENT OFFICE

2,201,982

COMBINATION TIRE CHANGER AND WHEEL BALANCER AND TOOL THEREFOR

Waldo J. Bazarek, Belvidere, Ill., assignor, by mesne assignments, of one-half to Andrew F. Wintercorn, and one-half to William N. Belk, Rockford, Ill.

Application July 13, 1935, Serial No. 31,291
Renewed July 8, 1939

4 Claims. (Cl. 144—288)

This invention relates to a combination tire changer and wheel balancer and tools therefor.

The application and removal of tires in the case of drop center rims can be greatly simplified and the scratching and marring of the wheels during these operations avoided if the wheel is placed on a convenient holder. However, that is as far as the equipment at present available goes so far as I am aware. It is the principal object of my invention to provide a tire changer which is not simply a wheel holder but which has a supporting arm that can be turned from one position to another in the course of the operations, to facilitate the mounting of the wheel and the removal and replacement of the tire thereon. Furthermore, in accordance with my invention, a portion of the quickly detachable wheel-hub fastening on the supporting arm is constructed to facilitate the use of special stripper and pusher tools in removing and replacing tires.

Another important object of my invention lies in the provision on a common axis with the wheel mounting post for the tire changer of a wheel mandrel for a wheel balancer, thus enabling utilization of the one machine for both purposes, the advantages of adjustability of the supporting arm being available for both the tire changer and wheel balancer to like degrees to facilitate mounting and dismounting the wheels as well as to facilitate operation upon the wheel in either case.

Still another object of my invention consists in the provision of an attachment in the form of a supporting arm which may be bolted rigidly to the standard of an existing tire changer, rotary adjustment for the tire changer post and wheel balancer mandrel being provided by a head swiveled on the outer end of the arm and arranged to be locked releasably in different positions. In this way, the advantages of the present invention are afforded at a fraction of the cost of an entire machine, and the purchaser obtains double duty from the standard of the existing machine and, at the same time, realizes a saving in floor space.

The invention is illustrated in the accompanying drawings, in which—

Figures 1 and 2 are side and top views of a machine made in accordance with my invention;

Fig. 3 is a cross-section through the end of the supporting arm and the adjacent upper end of the standard showing the latch mechanism;

Fig. 4 is a cross-section on the line 4—4 of Fig. 3;

Figs. 5-7 are miniature front views of the machine showing different positions of the tire changer post in the mounting of a wheel thereon and the removal of a tire therefrom;

Fig. 8 is a view similar to Fig. 6 showing the application of a tire to the wheel;

Fig. 9 is a view similar to Fig. 5, but showing a wheel with tire applied ready for removal;

Fig. 10 is a view similar to Fig. 9 showing a wheel balancer on the supporting arm and the wheel with tire applied in place thereon;

Fig. 11 is a top view of Fig. 6 showing the operation of the stripper;

Fig. 12 is a cross-section to better illustrate the cooperation of the tool with the wheel and tire;

Fig. 13 is an enlarged plan view of the operating end of the stripper;

Fig. 14 is a cross-section on the line 14—14 of Fig. 13;

Fig. 15 is a plan view of Fig. 8, showing the mode of operation of the pusher;

Fig. 16 is a cross-section to better illustrate the pusher;

Fig. 17 is a side view of the pusher;

Fig. 18 is a bottom view thereof;

Fig. 19 is a section through the wheel balancer, showing also how it is attached to the supporting arm of the tire changer;

Fig. 20 is a face view of the balancing rod;

Fig. 21 is a section on the line 21—21 of Fig. 19, showing the wheel trueness gauge;

Fig. 22 is a plan view of a tire changer showing an attachment thereon made in accordance with my invention for a combination tire changer and wheel balancer, and Fig. 23 is a perspective of Fig. 22.

The same reference numerals are applied to corresponding parts throughout the views.

Referring first to Figures 1-4, 24 designates a tripod base, the middle leg of which extends forwardly from the standard 25 in the same direction as the supporting arm 26 provided on the upper end of the standard. The arm 26 has an index plate 27 at right angles thereto carried on the inner end thereof arranged to turn about a stud 28 as a center, carried on a keeper plate 29 suitably secured on the upper end of the standard 25. Notches 30 in the rim of the index plate are arranged to receive a spring-pressed latch 31 that is releasable by thumb pressure on the handle 32 projecting from the back of the keeper plate within easy reach of the operator at all times. Now, the outer end of the arm 26 has a transverse hub portion 33 from one side of which a rigid tire changer post 34 extends, but into the other side of which a separate hub 35 may be fitted telescopically and secured with set screws 36 to provide a mounting for a wheel balancer mandrel 37, as will presently appear when reference is made to Fig. 19. A conical head 38 on the inner end of the post 34 can be used for centering the hub 39 of a wire wheel 40, as shown in Fig. 16, the wheel being centered on the conical head and clamped thereto by a plate 41 under the action of a hand nut 42. It will be noticed from observation of Fig. 2, particularly, and also Figs. 6 and 9, that the wheel when mounted on the machine has its center of mass slightly to one side of the center of revolution 28, whereby to substantially counterbalance the mass of the arm 26 on the opposite side of the center 28. This makes for good balance and easy turning of the arm 26 with the wheel. The post 34 is longitudinally grooved, as indicated at 43, to receive a spline on the plate 41, so that the latter is held against turning in the clamping of the wheel by the nut 42. The latter has split nut segments 44 movable into and out of engagement with the threads on the post 34, whereby to facilitate assembly and disassembly. The split nut segments are normally urged apart under the action of spring means, not shown. In clamping other types of wheels on the post 34, like the wheel 46 shown in Fig. 12, a separate spacer 47 is interposed between the plate 41 and the conical head 38, and, in this assembly, the conical portion 48 on the plate 41 serves to center the wheel. The machine will, therefore, take different styles and sizes of wheels by simply using the proper fittings on the post 34 and properly arranging the same. The workman quickly learns what is required for the different styles of wheels, and can mount one type just as readily as another. All of the wheels handled will have a drop-center rim, as indicated at 49, so that both beads a and b of the tire c can be brought into this recess in the usual way at one side of the wheel in putting on or taking off a tire. Other wheels like the disk wheel 46a in Fig. 1 can be handled too, similarly to the wheel 46. This wheel is of that type having a split ring d to retain the tire on the flush center rim thereof.

The foregoing description should enable one to understand clearly the description of the operation of the machine as portrayed in Figs. 5 to 10. Figs. 5 to 7 indicate the steps in taking off a tire: The wheel 40 with the tire c thereon is first placed loosely onto the post 34 while the arm 26 is disposed with this post extending approximately horizontally, as shown, as a matter of convenience for the operator. The operator will find it much easier to place the wheel on the post in that position than if it were say vertical. After the wheel is on the post, the arm 26 is turned in a clockwise direction 90°, thus placing the post 34 in a vertical position, as shown in Fig. 6. The plate 41 and hand nut 42 are then applied and the wheel is thereby centered and clamped and in readiness for the removal of the tire. A stripper tool 50, illustrated in Figs. 11 to 14, is used in getting the one bead b off the rim so that the tire has only its other bead still engaged on the rim. The arm 26 is now turned in a clockwise or counterclockwise direction 180° to invert the wheel, as shown in Fig. 7. With the wheel in that position, it is a simple matter to force the tire off, as gravity will aid in this final step. The position to which the tire is moved in the drop-center rim for the final stripping off is indicated in dotted lines in Fig. 7. In turning the arm 26 from one position to another, one may use the post 34 as a lever, and, of course, the latch 31 must be released for each movement. The operation of removing a tire is greatly simplified with this machine, because the arm 26 and post 34 are not simply a wheel holder as in other tire changers, the arm being free to be turned around, as described, to facilitate the different steps in the operation. After a tire has been removed and repaired, the arm 26 is turned around through 180° to the position shown in Fig. 8 to permit replacing the tire on the wheel. In this operation, a pusher tool 51, illustrated in Figs. 15 to 18, is used. This tool can be used also to loosen and remove split rings (d) from the old style wheels, and also to replace these rings, as will presently appear. The repairman does not have to use any so-called "tire irons" in removing or applying a tire with this machine; the stripper and pusher tools 50 and 51 do the entire job. These tools lighten the work so that there is less fatigue. They furthermore enable an unskilled workman to do this work entirely satisfactorily. There is no danger of marring or scratching the wheel, because both of the tools 50 and 51 work on the machine and not on the wheel, as will presently appear. When the tire is replaced on the wheel, the repairman may, if he so desires, inflate the tire while the wheel is still on the machine. At any rate, before removing the wheel with the tire thereon, the repairman will turn the arm 26 through 90° to the position shown in Fig. 9, so as to facilitate lifting the wheel off the post 34. The hand nut 42 and plate 41 may be removed before the arm is turned to this position or after; the parts 41 and 42 are shown left on in Fig. 9. So much for the tire changer operations. The wheel balancer will now be discussed briefly by reference to Fig. 10.

The mandrel 37 for the wheel balancer is not shown in Figs. 5 to 9, as a matter of simplifying the drawings, and also to indicate that the tire changer machine may be installed without the wheel balancer attachment. The attachment is applied as shown in Fig. 19, using the other end of the hub 33 opposite the tire changer as a support. The repairman after removing the wheel in Fig. 9, will first place the wheel on the mandrel 37 and then turn the arm 26 90° in a counterclockwise direction from the position shown in Fig. 10, for the purpose of centering and clamping the wheel on another conical head 52 provided on the mandrel 37, as illustrated in Fig. 19. A spacer 53 engages the flange of the hub 39 from the opposite side, as shown, and the wheel is clamped by the tightening of a nut 54 on the mandrel against the front of a balance rod 55 held in spaced relation to the spacer 53 by a spacer collar 56. With the wheel thus centered and clamped on the mandrel, the arm 26 can then be turned through 90° back to the position shown in Fig. 10 for the wheel balancing operations to which further reference will be made later.

The tire stripper 50, as illustrated in Figs. 11 to 14, comprises a lever 57 carrying a stripper head 58 on a downwardly offset end thereof to work around the rim and the tire bead, as clearly appears in Figs. 11 and 12. The other end of the lever 57 is approximately in the plane of the annular recess 59 between the plate 41 and the rim of the hand nut 42, and will usually be entered in this recess, as shown in full lines in Fig. 11, although with certain wheels the plate 41 and nut 42 will be too low for this lever to operate in the annular recess, and, in that event, the lever will bear directly against the side of the post 34, as indicated in dotted lines in Fig. 11. In either event, it is clear that a portion of the machine is used as an abutment and guide for the stripper tool in the removal of the tire from the wheel. A hand lever 60 of ample length to provide enough mechanical advantage is secured to the lever 57 in substantially right angle relation thereto, as shown. The stripper head 58 carries three rollers 61, 62 and 63, 61 projecting upwardly and 63 downwardly from the head, and 62 being disposed horizontally in the plane of the head. The head is entered between the tire bead b and the rim of the wheel so that the roller 63 engages the outer periphery of the rim, as clearly appears in Fig. 12, and the roller 61 engages the inner periphery of the bead b. The roller 62 engages the bead from the inner side in advance of the rollers 61 and 63, as best appears in Fig. 11. In that way, as the head 58 is drawn forwardly in a clockwise direction, as indicated by the small arrow in Fig. 11, it is apparent that the roller 62 will lift the bead b out of engagement with the rim, and that the tool will keep its proper position with relation to the wheel and tire by reason of engagement of the roller 61 with the bead of the tire and the roller 63 with the rim of the wheel. The rollers give anti-friction operation and accordingly reduce the force required to be applied to the hand lever 60. The rollers furthermore reduce likelihood of broken beads on tires removed on the machine, or marred and scratched finishes on the wheels operated upon.

The pusher tool 51, as illustrated in Figs. 15 to 18, comprises a yoke 64 arranged to operate in the annular space 59 between the plate 41 and hand nut 42, as clearly illustrated in Figs. 15 and 16. A hand lever 65 is pivoted at its inner end to the yoke 64, as at 66, and near its inner end has an arm 67 pivoted thereon, as at 68. The latter has the free end 69 formed substantially V-shaped to provide gripping jaws to receive the tire bead a or b therein, as the case may be, substantially as shown in Fig. 16. In operating with this tool, the yoke is simply entered in the space 69 for guidance and support, and the arm 67 is placed with the jawed end 69 in engagement with the bead of the tire, whereupon the hand lever 65 is swung outwardly to force the tire bead out over the rim and then downwardly onto the rim. First the inner bead a is brought into place and then the outer bead b. The operator quickly learns to operate the tool with short strokes, at the same time turning the tool around on the machine as the work progresses. Considerable leverage is, of course, provided by reason of the close spacing of the pivots 66 and 68 with relation to the length of the hand lever 65, and there is, therefore, little force required on the handle to do the work. The fact, too, that the tool uses the machine as a support and guide, avoids any marring or scratching of the wheel. The jaw end of the arm 67 grips a sufficient width of bead so that there is no danger of rupturing the tire. The shoe 64a pivoted on the yoke 64 in the recessed portion 64b for swinging movement from the retracted full line position, enables use of the tool on wheels of larger diameter by permitting operation of the arm 67 farther from the post 34.

Referring now to Figs. 19 to 21 illustrating the wheel balancer, it will be seen that the bearing 35 in which the mandrel 37 is mounted has a laterally projecting lug 70 in which a standard 71 is mounted for vertical adjustment to support a trueness gauge 72 adjacent the tread of the tire, as in Fig. 19. Revolution of the wheel with the mandrel 37 relative to the gauge 72 will at once indicate whether a wheel requires truing up, assuming, of course, care has been exercised in centering and clamping of the wheel on the mandrel in the first instance. If the wheel is out of balance, that is also quickly apparent by noting whether it always comes to rest in one position. If so, the lower portion is obviously heavier, and it is the purpose of the wheel balancer to determine the amount and necessary location of a weight to restore true balance in the wheel. That is done as follows: The balancing rod 55 in which a series of longitudinally spaced holes 73 is provided on both sides of center is placed in the same vertical plane with the heavier portion of the wheel when the wheel comes to rest. Then the wheel is turned through 90° and two pegs 74 and 75 are inserted in holes at the same distance from center, and washers 76 are placed on these pegs, more on one peg than on the other, as illustrated for example in Fig. 19, so as to weight the lighter side enough to approximately counterbalance the heavier side of the wheel. When it is found that the wheel will not gravitate always to a certain position, the operator knows that he has obtained correct balance. It is then simply a matter of attaching weights to the spokes of the wheel at the same location as the weight on the balancing rod, and equal in weight to the counterbalancing washers, in order to place the wheel in true balance. Split lead sleeves can be used which can be slipped over the spokes from the side and then clinched.

In Figs. 22 and 23, I have shown an attachment 77 applied to an existing tire changer 78, which in this instance is of a type designed for use with split rims. This attachment comprises a bracket 79 arranged to bolt onto the top of the standard 80 of the machine so that the arm 81, which in a way corresponds with the arm 26 of the machine first described, is between two of the expanding arms 82 and won't interfere with the operation of the machine 78 when the latter is used alone. A head 83 is swiveled on the outer end of the arm 81, its index plate 84 being arranged to be locked releasably in different positions with respect to the keeper plate 85 by means of a spring-pressed latch which can be released by a pull on the wire 86 connected therewith. The head 83 carries in diametrically opposed relation the rigid post 34 for the tire changer and the mandrel 37 for the wheel balancer. It is seen, therefore, that with this attachment a machine that would otherwise be useful only on split rims, is rendered useful on drop-center rims and for wheel balancing too. This is of particular advantage in a small shop having limited floor space. It also affords the advantages of a complete new tire changer and wheel balancer at a small fraction of the cost.

It is believed the foregoing description conveys a good understanding of the objects and advantages of my invention. The appended claims have been drawn with a view to covering all legitimate modifications and adaptations.

I claim:

1. A device of the class described comprising a support, a horizontal swivel thereon, a substantially horizontal arm rotatably carried on said swivel with its center of mass spaced radially in one direction from the swivel axis, manually releasable means for detachably securing the arm in adjusted position, a post for supporting a wheel on the outer end of said arm, said post being in transverse relation to the arm and movable in the turning thereof to horizontal and vertical positions, and means on said post for engagement with the hub of the wheel to clamp the same thereon in a plane substantially parallel with the arm but with its center of mass spaced radially in the opposite direction from the swivel axis.

2. In a tire changer comprising a threaded post adapted to extend through the hub of a wheel, means at the inner end of the post providing a surface against which the hub of a wheel may be positioned, a plate member removably disposed on the post to engage the wheel hub from the opposite side whereby the wheel is arranged to be centered approximately and clamped on the post between the plate and aforesaid surface, and a hand nut threadable on the post into abutment with the plate member for clamping purposes, said nut and plate member being relatively conformed to provide therebetween an annular guide concentric with the post and wheel clamped thereon, for the purpose described.

3. In a tire changer, the combination of a stationary upright standard, a supporting base therefor arranged to be secured to the floor, a flat swivel bearing surface provided on the upper end of said standard in a substantially vertical plane, a horizontal swivel stud centrally arranged relative to said bearing surface and disposed at right angles to the plane thereof, a substantially horizontal arm disposed in transverse relation to the upper end of said standard and having a companion flat swivel bearing surface on one end thereof in a substantially vertical plane engaging the aforesaid surface on the standard, said arm being supported on said swivel stud with the latter centrally arranged relative to the companion surface, the arm having its center of mass slightly spaced radially from the swivel axis in one direction, a post carried on the outer end of said arm in transverse relation thereto and movable in the turning of said arm from horizontal to vertical positions projecting upwardly or downwardly, and wheel clamping means on the post so disposed with respect to the arm whereby to hold a wheel by the hub thereof in a plane substantially parallel with the arm but with its center of mass radially spaced slightly relative to the swivel axis in the opposite direction from the aforesaid arm.

4. In a tire changer comprising a threaded post adapted to extend through the hub of a wheel, cone means at the inner end of the post providing a tapered surface against which the hub of a wheel may be positioned for centering and support, a plate member removably disposed on the post to engage the wheel hub from the opposite side whereby the wheel is arranged to be centered and clamped on the post between the plate and aforesaid surface, and a hand nut threadable on the post into abutment with the plate member for clamping purposes, said nut and plate member being relatively conformed to provide therebetween an annular guide concentric with the post and wheel clamped thereon, for the purpose described.

WALDO J. BAZAREK.